United States Patent Office 3,393,158
Patented July 16, 1968

3,393,158
PROCESS FOR POLYMERIZING TETRAFLUORO-
ETHYLENE EPOXIDE
Joseph L. Warnell, Wilmington, Del., assignor to E. I. du
Pont de Nemours and Company, Wilmington, Del., a
corporation of Delaware
No Drawing. Filed Dec. 11, 1964, Ser. No. 417,833
7 Claims. (Cl. 260—2)

ABSTRACT OF THE DISCLOSURE

The polymerization of tetrafluoroethylene epoxide by contacting same with a tertiary amine catalyst at a temperature within the range of about −110° C. to −30° C.

---

A method for preparing the epoxide monomer is described in U.S. Pat. No. 2,451,185. The polymerization of tetrafluoroethylene epoxide in the presence of an activated charcoal catalyst at a temperature of −80° to +40° C. is described in U.S. Pat. No. 3,125,599.

It is an object of the present invention to provide a different catalyst for this polymerization reaction. Another object is to provide a new process for polymerizing tetrafluoroethylene epoxide to polyethers. Another object is to polymerize chlorotrifluoroethylene epoxide. These and other objects will appear hereinafter.

These and other objects of the present invention are accomplished by contacting tetrafluoroethylene epoxide or chlorotrifluoroethylene epoxide at a temperature of about −110° to −30° C. with 0.0005 to 0.05 mole of aliphatic or cyclic tertiary amine per mole of the epoxide and obtaining as result thereof the corresponding polymer. The polymer may be obtained in the form ranging from an oil to a solid depending on polymerization conditions as will be explained hereinafter.

With respect to process characteristics, the polymerization vessel can be glass, quartz, stainless steel, glass-lined steel or similar materials. For convenience, glass is generally used. If desired, the catalyst can be dissolved in suitable inert solvents such as mixed perfluorinated cyclic ethers, commercially available as FC-75 from 3M, or slurried in an inert liquid. It is frequently convenient to introduce the tertiary amine catalyst to the monomer in a sealed container which can then be broken inside the reaction zone.

The polymerization is carried out in closed vessels generally at autogenous pressure, which may be subatmospheric at temperatures below −63° C. or superatmospheric at temperatures above −63° C., the boiling point of tetrafluoroethylene epoxide. The presence of inert solvents during the polymerization is not required, but may be desirable for dilution of the monomer or to assist in swelling and dispersing the homopolymer.

As mentioned, the polymerization occurs at temperatures ranging from about −110° C. to about −30° C. The temperature range of from about −80° C. to about −40° C. is preferred. As the temperature of polymerization is raised, the molecular weight of the resulting polymer tends to be lower.

The amount of catalyst employed is that which will catalyze the polymerization reaction at the desired rate; this amount usually ranges from about 0.05 to 5 mole percent based on the epoxide monomer. In general, when preparing polymers having low molecular weights (exhibiting inherent viscosities below about 0.05) preferred amounts of catalyst are 2 to 5 mole percent based on the weight of the epoxide monomer. In general, when preparing polymers having high molecular weights (exhibiting inherent viscosities above about 0.1) preferred amounts of catalyst are 0.1 to 1 mole percent based on the monomer. The polymerization time will vary with the degree of polymerization or inherent viscosity desired for the polymer and the reaction conditions and catalyst employed.

Representative tertiary amines which may be used in the process of the invention are aliphatic tertiary amines such as trimethyl amine, triethylamine, tributylamine, trihexylamine; and cyclic amines such as N-methylmorpholine, N,N-dimethylpiperazine, N-ethylpiperidine, pyridine, 2,6-dimethylpyridine, and 2,4,6-trimethylpyridine. Preferred tertiary amines are triethylamine and N-ethylpiperidine which are readily available and convenient to use. Mixtures of tertiary amines may also be used. The tertiary amines need not be specially purified to be operable in the process of the invention. As much as about 5% of water or a secondary amine based on the weight of the tertiary amine catalyst has no noticeable adverse effect on the polymerization.

The polyethers of the present invention are readily soluble at room temperature in fluorocarbon solvents such as perfluorodimethylcyclobutane, perfluorocyclohexane, perfluoroheptane, etc. This property makes them useful for applications such as coatings. Since the polyethers of the present invention are characterized by excellent thermal stability, chemical inertness, and dielectric properties, they are useful in such applications as lubricants, as antisoilants for fibers, and as plasticizers.

The following examples, in which parts and percents are by weight unless otherwise noted, are presented merely to describe specific embodiments of the present invention, and therefore are not intended as a limitation on the scope thereof.

EXAMPLE 1

Into an evacuated glass flask equipped with a magnetic stirrer is condensed at −75° C. 10 gm. (.0864 mole) of tetrafluoroethylene epoxide. Triethylamine 0.063 gm. (.000624 mole) dissolved in 1 ml. of mixed perfluorinated cyclic ethers (FC–75) is added with stirring. The temperature is adjusted to −60° C. and the reaction mass is held at this temperature for 1 hour. The temperature is then raised to −40° C. during a 1½ hour period. At this time the reaction mass is solidified. The flask and contents are warmed to −20° C. and then evacuated. The residue is dissolved in FC–75. Upon evaporation of the solvent by heating to about 150° C. under vacuum, a waxy solid is recovered which is identified by its infrared spectrum as polytetrafluoroethylene oxide. A composite of several samples prepared by this method is dissolved in FC–75, and then extracted twice with water. After drying the polymer the inherent viscosity is 0.05.

Example 2

Into an evacuated glass flask equipped with a magnetic stirrer is condensed at −73° C. 5.0 gm. (.0432 mole) of tetrafluoroethylene epoxide. Ten ml. of mixed perfluorinated cyclic ethers (FC–75) is added to dissolve polymer to be formed. A solution of .069 gm. (.000373 mole) of tri-n-butylamine in 1 ml. of FC–75 is added with stirring. Over a 5¾ hour period the temperature is gradually raised to −40° C. The flask is then evacuated and heated to about 150° C. to remove volatiles. The white waxy solid residue is identified as polytetrafluoroethylene oxide by its infrared spectrum.

Example 3

Into a dry, evacuated flask at −80° C. 24 gm. (0.207 mole) of tetrafluoroethylene epoxide is introduced, and 0.2512 gm. (0.00222 mole) of N-ethyl piperidine is added and held for 8 minutes. The contents are transferred by distillation to another flask cooled in liquid nitrogen. The flask and contents are warmed to −80° C. and held at this temperature for 3 days at which time the mixture is solid. Unreacted monomer and low molecular weight products are removed by warming the flask under vacuum. A polymer of tetrafluoroethylene oxide is recovered, having an inherent viscosity of 0.11.

Example 4

Into a dry, evacuated flask at −80° C. 32 gm. (0.276 mole) of tetrafluoroethylene epoxide and 0.144 gm. (.00126 mole) of N,N'-dimethylpiperazine are introduced, mixed and held for 10 minutes. Slight reaction is observed. The remaining unreacted contents are then transferred by evacuation to another flask at a temperature of −196° C. Upon warming this flask and contents to −80° C. and holding at this temperature for 17 hours the mass solidifies. Unreacted volatiles are removed by venting and heating to about 150° C. at 1 mm. pressure. A polymer of tetrafluoroethylene oxide is identified by its infrared spectrum. It has an inherent viscosity of 0.155.

Example 5

Into an evacuated flask equipped with a stirrer is added at −80° C. 2 mil. (3 gms.) of tetrafluoroethylene epoxide. The flask and contents are cooled with liquid nitrogen to −196° C. At this temperature the tetrafluoroethylene epoxide solidifies in the bottom of the flask. Twenty-five milliliters of trimethylamine gas (.001 mole) is introduced, and freezes on the inner wall of the flask. The flask and contents are held at −196° C. for 15 minutes and then over a period of 50 minutes they are gradually warmed to about −80° C. by first replacing the liquid nitrogen cooling bath with diethyl ether "ice" at a temperature of about −118° C., and then replacing the diethyl ether cooling bath with a Dry Ice/acetone bath at a temperature of about −80° C. The trimethylamine and tetrafluoroethylene epoxide melt and react slowly to form a thick porous crust over the liquid tetrafluoroethylene epoxide. No further change is observed when the mixture is stirred. The flask and contents are then warmed to −60° C. over a 20-minute period and the unreacted gases are vented. Infrared analysis of the vented gases show the presence of tetrafluoroethylene epoxide only. On warming gradually to room temperature, the residue becomes a white semi-solid.

The residue is washed with water and then extracted with perfluorodimethylcyclobutane followed by washing of the extract with water, and drying with an infrared lamp. An oily polymer of tetrafluoroethylene epoxide (0.3 gm.) is recovered, and identified by its infrared spectrum.

Example 6

Into a dry, evacuated flask cooled with liquid nitrogen to −196° C. is introduced 28 gms. (0.24 mole) of tetrafluoroethylene epoxide. Triethyl amine, .0264 gm. (0.000261 mole) is then introduced. The flask and contents are warmed to −80° C. by means of a Dry Ice/acetone bath and held at −80° C. without agitation for 72 hours. The flask and contents are warmed to room temperature and unreacted tetrafluoroethylene epoxide is vented. The white solid residual polytetrafluoroethylene oxide is dissolved in mixed perfluorinated cyclic ethers (FC–75), dried with an infrared lamp under vacuum, and identified by its infrared spectrum.

Example 7

Into a dry, evacuated flask equipped with a magnetic stirrer is introduced at −78° C. 20 ml. of chlorotrifluoroethylene epoxide and 0.1 ml. triethylamine. The mixture is held at −65° C. for two days at which time the contents become a clear viscous liquid. Unreacted monomer is removed by warming the flask to room temperature under vacuum. A polymer of chlorotrifluoroethylene oxide is obtained, having an inherent viscosity of 0.027.

The inherent viscosities reported in this specification are measured at 30° C. on a solution containing 0.5 gm. of polymer dissolved in 100 ml. of mixed perfluorinated cyclic ethers commercially available as FC–75 from the Minnesota Mining and Mfg. Co. Other tertiary amines can be employed in the foregoing examples, and similar results will be obtained.

As many widely different embodiments of this invention may be made without departing from the spirit and scope thereof, it is to be understood that this invention is not limited to the specific embodiments thereof except as defined in the appended claims.

I claim:
1. A process comprising contacting tetrafluoroethylene epoxide at a temperature of about −110° C. to −30° C. with 0.0005 to 0.05 mole of a tertiary amine as the sole catalyst component selected from the group consisting of trimethylamine, triethylamine, tributylamine, trihexylamine, N-methylmorpholine, N,N-dimethylpiperazine, N-ethylpiperidine, pyridine, 2,6-dimethylpyridine, and 2,4,6-trimethylpyridine per mole of said epoxide and obtaining as a result thereof a polymer of a tetrafluoroethylene epoxide.
2. The process as recited in claim 1 wherein said tertiary amine is dissolved in an inert solvent consisting essentially of mixed perfluorinated cyclic ethers.
3. The process as recited in claim 1 wherein said tertiary amine is triethylamine.
4. The process as recited in claim 1 wherein said tertiary amine is N-ethylpiperidine.
5. The process as recited in claim 1 wherein the temperature range is from −80° C. to −40° C.
6. The process as recited in claim 1 wherein from 0.001 to 0.01 mole of said tertiary amine is present per mole of said epoxide.
7. A process comprising contacting a monomer selected from the group consisting of tetrafluoroethylene epoxide and chlorotrifluoroethylene epoxide at a temperature of about −110° C. to −30° C. with 0.0005 to 0.05 mole of a tertiary amine as the sole catalyst component selected from the group consisting of trimethylamine, triethylamine, tributylamine, trihexylamine, N-methylmorpholine, N,N-dimethylpiperazine, N-ethylpiperidine, pyridine, 2,6-dimethylpyridine, and 2,4,6-trimethylpyridine per mole of said epoxide and obtaining as a result thereof a polymer corresponding to said monomer.

References Cited

UNITED STATES PATENTS

| | | | |
|---|---|---|---|
| 3,135,705 | 6/1964 | Vandenberg | 260—2 |
| 3,284,374 | 11/1966 | Daimon et al. | 260—2 |
| 3,052,650 | 9/1962 | Wear et al. | 260—47 |
| 3,067,174 | 12/1962 | Sullivan | 260—2 |

WILLIAM H. SHORT, *Primary Examiner.*

T. E. PERTILLA, *Assistant Examiner.*